(12) United States Patent
Atarius et al.

(10) Patent No.: US 8,031,645 B2
(45) Date of Patent: Oct. 4, 2011

(54) ARCHIVAL OF SESSION DATA EXCHANGED WITH A WIRELESS COMMUNICATION NETWORK

(75) Inventors: Roozbeh Atarius, San Diego, CA (US); Ramachandran Subramanian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 535 days.

(21) Appl. No.: 11/399,833

(22) Filed: Apr. 6, 2006

(65) Prior Publication Data
US 2007/0266089 A1   Nov. 15, 2007

Related U.S. Application Data

(60) Provisional application No. 60/669,440, filed on Apr. 8, 2005.

(51) Int. Cl.
*H04B 7/00* (2006.01)
(52) U.S. Cl. ........ 370/310; 370/312; 370/270; 370/428; 709/206; 709/227; 709/217
(58) Field of Classification Search .......... 370/428, 370/310–328, 270; 455/412.1; 709/204, 709/224–225
See application file for complete search history.

(56) References Cited

U.S. PATENT DOCUMENTS

| | | | |
|---|---|---|---|
| 7,047,041 B2 * | 5/2006 | Vanska et al. | 455/558 |
| 7,054,905 B1 * | 5/2006 | Hanna et al. | 709/206 |
| 7,450,937 B1 * | 11/2008 | Claudatos et al. | 455/418 |
| 2003/0163704 A1 | 8/2003 | Dick | |
| 2003/0208608 A1 * | 11/2003 | Merriam | 709/229 |
| 2003/0212687 A1 * | 11/2003 | Gonos | 707/100 |
| 2004/0080504 A1 | 4/2004 | Salesky | |
| 2004/0158870 A1 * | 8/2004 | Paxton et al. | 725/115 |
| 2004/0191748 A1 * | 9/2004 | Thean et al. | 434/350 |

(Continued)

FOREIGN PATENT DOCUMENTS

WO   WO 2004100581   11/2004

OTHER PUBLICATIONS

International Search Report and Written Opinion—PCT/US2006/013116, International Search Authority—European Patent Office—Jun. 11, 2006.

(Continued)

*Primary Examiner* — Kamran Afshar
*Assistant Examiner* — Kathy Wang-Hurst
(74) *Attorney, Agent, or Firm* — D. Scott Juneau (57) ABSTRACT

Techniques for archiving data exchanged between a terminal and a wireless communication network during a session are described. Session data may be archived at a network entity in real-time while the session is in progress or may be uploaded to the network entity for archival after the session has terminated. The network entity may archive all data exchanged during the session or only data of the terminal, depending on whether authorization is received from other terminals in the session. The network entity may assign an identifier for the session and may store the identifier and other attributes for the session. During or after the session, the network entity may receive from the terminal a request for all or a portion of the archived data and would then provide the requested data. The network entity may archive a single copy of the session data for all terminals in the session.

42 Claims, 5 Drawing Sheets

U.S. PATENT DOCUMENTS

2004/0193683 A1* 9/2004 Blumofe .................. 709/204
2004/0203621 A1* 10/2004 Brown et al. ............ 455/412.1
2004/0225743 A1 11/2004 Huggins
2006/0010213 A1* 1/2006 Mehta ..................... 709/206
2006/0197562 A1 9/2006 Smith et al.

OTHER PUBLICATIONS

Taiwanese Search Report—TW095112544—Search Authority—TIPO—Jul. 14, 2009.

* cited by examiner

ARCHIVAL OF SESSION DATA EXCHANGED WITH A WIRELESS COMMUNICATION NETWORK

CLAIM OF PRIORITY UNDER 35 U.S.C. §119

The present Application for Patent claims priority to Provisional Application Ser. No. 60/669,440, entitled "ARCHIVAL OF BEARERS IN A SESSION FOR LATER RETRIEVAL BY CLIENT," filed Apr. 8, 2005, assigned to the assignee hereof, and expressly incorporated herein by reference.

BACKGROUND

I. Field

The present disclosure relates generally to communication, and more specifically to techniques for archival of data exchanged in a session with a wireless communication network.

II. Background

Wireless communication networks are widely deployed to provide various communication services such as voice, video, data, messaging, broadcast, and so on.

These wireless networks may be multiple-access networks capable of supporting communication for multiple users by sharing the available network resources (e.g., bandwidth and transmit power). Examples of such multiple-access networks include Code Division Multiple Access (CDMA) networks, Time Division Multiple Access (TDMA) networks, and Frequency Division Multiple Access (FDMA) networks.

A user may have a session with a wireless network and may communicate with other users and/or other entities during the session. The user may exchange any type and any amount of data via the wireless network during the session. The user may want to have a record of the session for possible retrieval and use later. However, saving a record of the session may not be trivial for various reasons. For example, a large amount of data may be exchanged during the session, and the user may not have the storage capacity to store all of the data. Other issues related to storage of data for the session are described below.

There is therefore a need in the art for techniques to efficiently store data exchanged during a session for possible use later.

SUMMARY

Techniques for archiving data exchanged between a terminal and a wireless communication network in a session are described herein. Session data may be archived at a network entity (e.g., a storage server or an application server) in real time while the session is in progress. Session data may also be uploaded from the terminal to the network entity for archival after the session has terminated. The network entity may archive all of the data exchanged during the session or only data of/from the terminal, depending on whether authorization to archive is received from other terminals in the session. The network entity may assign an identifier for the session and may store the identifier as well as other user-defined attributes for the session. During or after the session, the network entity may receive from the terminal a request for all or a portion of the archived data and may then provide the requested data. The network entity may archive a single copy of the session data for all terminals in the session. Various features related to archival of session data are described below.

According to an embodiment of the invention, an apparatus is described which includes a processor and a storage unit. The processor receives data exchanged between a terminal and a wireless communication network in a session. The storage unit archives the data exchanged in the session for possible use later by the terminal.

According to another embodiment, a method is provided in which data exchanged between a terminal and a wireless communication network in a session is received at a network entity and archived for possible use later by the terminal.

According to yet another embodiment, an apparatus is described which includes means for receiving data exchanged between a terminal and a wireless communication network in a session, and means for archiving the data exchanged in the session for possible use later by the terminal.

According to yet another embodiment, an apparatus is described which includes a processor and a memory. The processor exchanges data with a wireless communication network in a session and retrieves data archived by a network entity for the session. The memory stores the data retrieved from the network entity.

According to yet another embodiment, a method is provided in which data is exchanged with a wireless communication network in a session. A request to archive the data exchanged in the session is provided to a network entity capable of archiving the data. The data archived by the network entity for the session is thereafter retrieved.

According to yet another embodiment, an apparatus is described which includes means for exchanging data with a wireless communication network in a session, means for providing to a network entity a request to archive the data exchanged in the session, and means for retrieving data archived by the network entity for the session.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
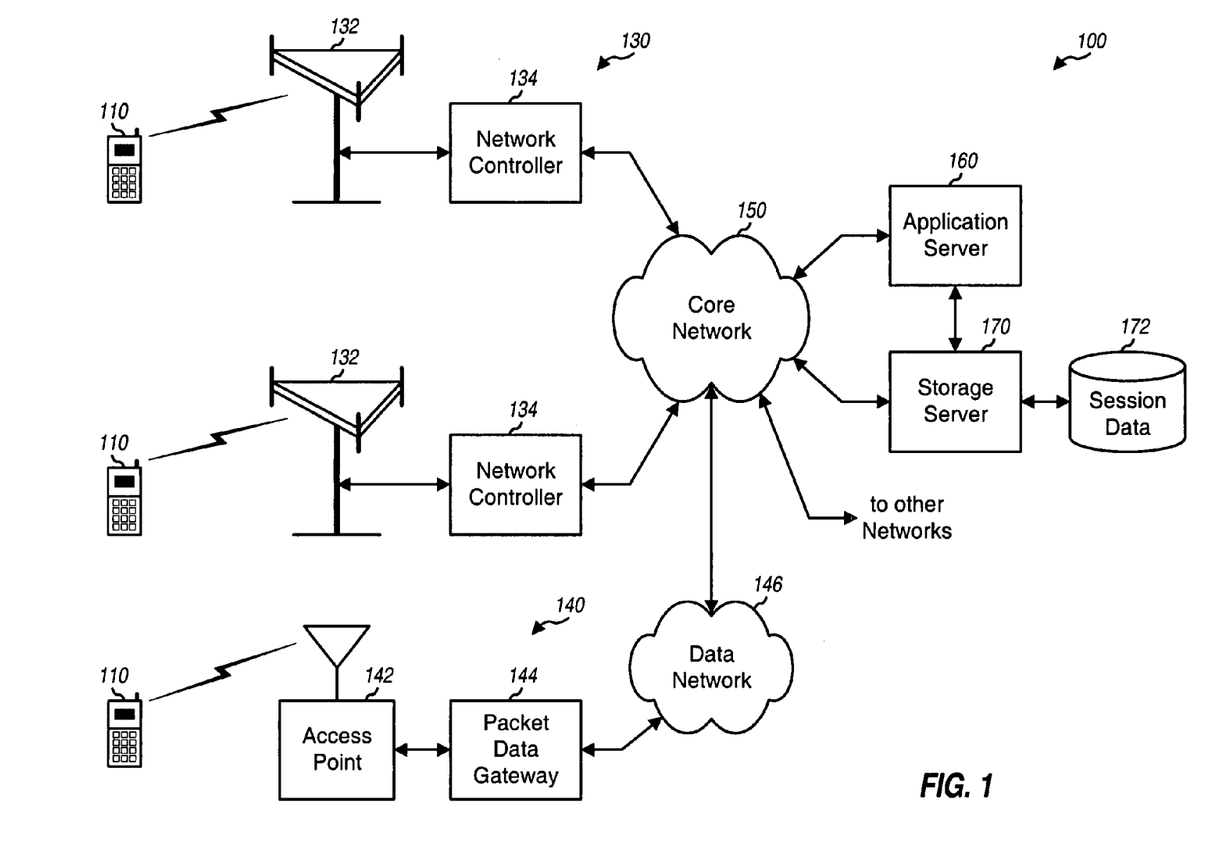
FIG. 1 shows a deployment of various wireless networks and network entities.

FIG. 1 shows a deployment 100 in which terminals 110 communicate with wireless networks 130 and 140 to obtain various communication services such as voice, video, data, messaging, broadcast, and so on. A terminal may also be referred to as a client, a user equipment (UE), a mobile station (MS), a user terminal, a subscriber unit, or some other terminology. A terminal may be a cellular phone, a personal digital assistant (PDA), a wireless device, a handheld device, a wireless modem, and so on. In the following description, the terms "terminal" and "user" may be used interchangeably.

Wireless network 130 may be a wireless wide area network (WWAN) such as a CDMA network, a TDMA network, an FDMA network, or some other WWAN. A CDMA network may implement a radio technology such as cdma2000, Wideband-CDMA (W-CDMA), and so on. cdma2000 covers IS-2000, IS-856 and IS-95 standards. A TDMA network may implement a radio technology such as Global System for Mobile Communications (GSM), Digital Advanced Mobile Phone System (D-AMPS), and so on. D-AMPS covers IS-136 and IS-54. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2).

Wireless network 130 includes base stations 132 and network controllers 134. Base stations 132 provide radio communication for terminals 110. A base station may also be referred to as a Node B, a base transceiver subsystem (BTS), or some other terminology. Each network controller 134 may be a single network entity or a collection of network entities that support exchange of data between base stations 132 and a core network 150. For 3GPP, network controller 134 may include a Radio Network Controller (RNC), a Serving GPRS Support Node (SGSN), a Gateway GPRS Support Node (GGSN), and/or other network entities. For 3GPP2, network controller 134 may include a Mobile Switching Center (MSC), a Packet Control Function (PCF), a Packet Data Serving Node (PDSN), and/or other network entities. Core network 150 supports communication among various entities within the core network as well as entities connected to the core network. Core network 150 may further couple to other networks such as the Internet, a Public Switched Telephone Network (PSTN) that supports communication for conventional telephones, and so on.

Wireless network 140 may be a wireless local area network (WLAN) or a wireless personal area network (WPAN). For example, wireless network 140 may be an IEEE 802.11 network (often referred to as a Wi-Fi network), a Bluetooth personal area network (BT-PAN), or some other network. Wireless network 140 includes access points and network controllers. For simplicity, only one access point 142 and one network entity 144 are shown in FIG. 1. Access point 142 provides radio communication for terminals 110. Network controller 144 supports exchange of data between access point 142 and a data network 146, which may connect to core network 150. For IEEE 802.11, network controller 144 may include a Packet Data Gateway (PDG) and/or other network entities.

An application server 160 supports one or more applications such as Instant Messaging (IM), Push-to-Talk (PTT), Push-to-talk Over Cellular (POC), and so on. A storage server 170 supports archival (e.g., storage, management, and retrieval) of session data for terminals 110. A storage unit 172 stores the session data. Servers 160 and 170 may couple to core network 150 or may be part of the core network. Servers 160 and 170 may be separate servers (as shown in FIG. 1) that may or may not be coupled directly to each other. Storage server 170 may also be part of application server 160. Storage unit 172 may be part of storage server 170 but is shown separately to highlight the archival of session data.

FIG. 1 shows an exemplary deployment. In general, a terminal may communicate with any wireless and/or wireline communication network, and each network may include any number of network entities. A network may include or may be coupled to storage server 170, which supports archival of session data.

Figure 2:
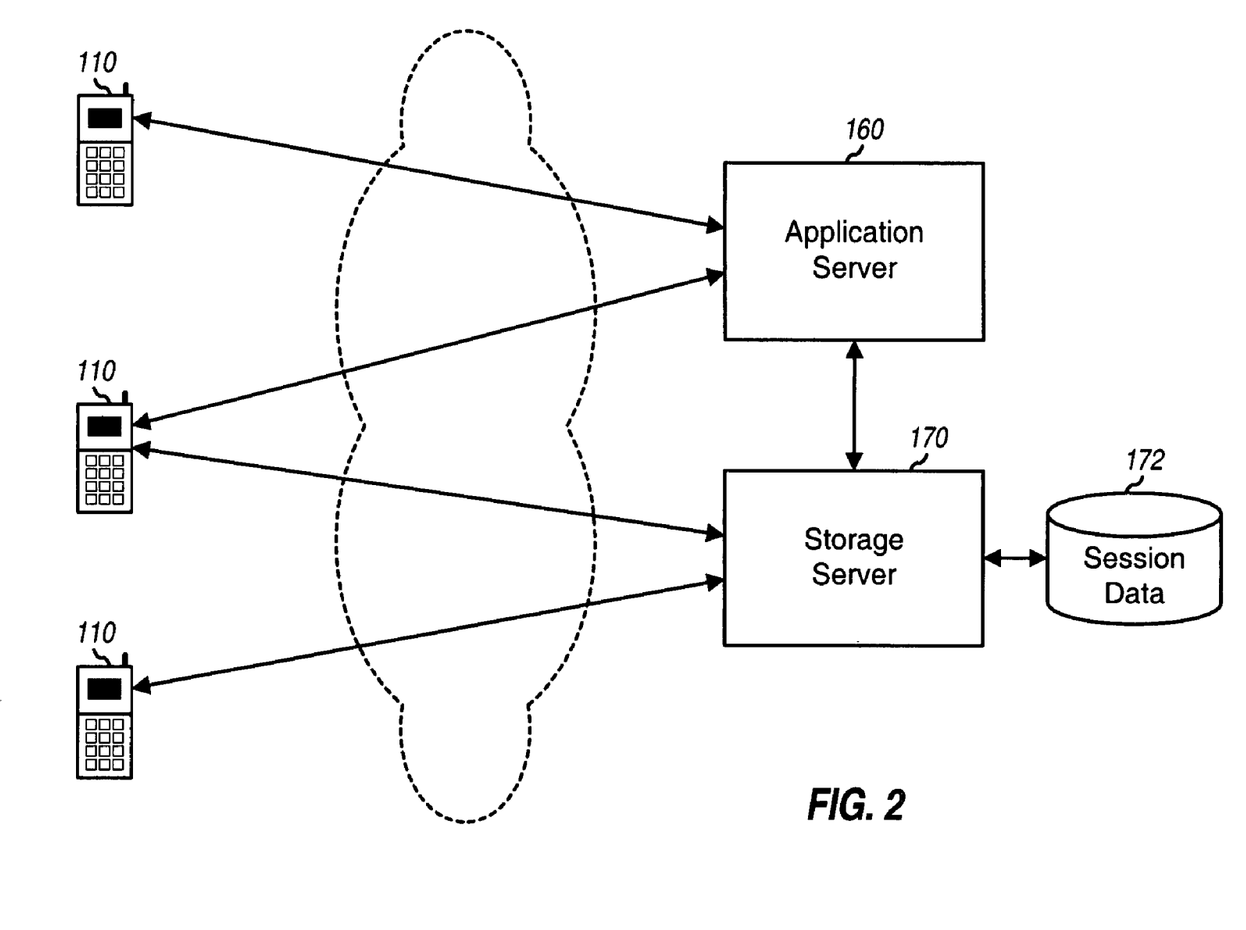
FIG. 2 shows a top-level view of entities at an application layer.

FIG. 2 shows a top-level view of various entities at an application layer. A terminal 110 may communicate via a communication network with application server 160 for any application (e.g., IM) supported by the server. Alternatively or additionally, a terminal 110 may communicate with storage server 170 for archival of session data. Servers 160 and 170 may communicate with one another, as shown in FIG. 2.

A user with a terminal may exchange data with a communication network in a session. As used herein, a session is an association between two or more users and/or entities that enables the users and/or entities to exchange data. Each session is unique and may be identified by an identifier (ID). A session may be of any duration, may be continuous or sporadic, and may be for any communication service. As used herein, session data is data for a session. Session data may be any data that is exchanged via a communication network during a session. Session data may also include other information associated with the session. Session data may be of various types such as voice, video, text, pictures, graphics, messages, and so on. Data may be exchanged continuously (e.g., for voice or video), periodically (e.g., for text), or sporadically (for packet data) during a session. A terminal may exchange any type and any amount of data via a communication network during a session.

A user may desire to save a record of a session for possible retrieval and use later. In general, archival covers all aspects related to storage, management, and retrieval of session data. Archival may include the following aspects:

Initiation of archival—relates to how archival of a session may be initiated.

Authorization—relates to whether or not session data may be archived.

Storage—relates to how session data is stored for archival.

Management and retrieval—relates to how session data is managed.

Sharing—relates to sharing of session data among users.

Security—relates to protection of session data against unauthorized access.

Each of the aspects is described below.

Initiation of Archival

Archival of session data may be initiated in various manners. Any one or any combination of the following may be used to initiate archival of session data.

In an embodiment, archival of session data is initiated by a user, e.g., by entering a request to archive via a keypad. This embodiment allows the user to determine (1) whether or not to archive session data for each session and (2) when to start archiving session data. The request to archive may come at any time during the session, e.g., at the start, middle, or end of the session.

In another embodiment, archival of session data is initiated based on a user profile. The user may set and/or update archival preferences in the user profile. The user profile may be stored at the network and/or the terminal and may be consulted at the start of a session to determine whether or not to archive the session. The user profile may indicate which types of session to archive and which types of session to not archive. For example, the user profile may indicate archival of all sessions, archival of sessions with certain types of media (e.g., voice) or certain applications (e.g., IM), archival of sessions with certain parties (e.g., those stored in a phone list), archival of sessions with certain network entities (e.g., application server 160), and so on. Archival of a session may be initiated automatically based on the user profile.

In yet another embodiment, which is referred to as early automatic archival, the network starts saving data early in the session, e.g., at the start of the session. This data saving may be performed automatically without receiving any command from the user and without having to consult any user profile.

The early automatic archival allows the user to later request archival of data that was saved earlier. For example, the user may not realize that important data has been exchanged until after the exchange has occurred or at the end of the session. The early automatic archival would then allow the user to recapture important data that would have been lost if the network has not performed the automatic save early in the session.

The early automatic archival is also helpful against capacity limitation at the terminal. For example, the user may command the terminal to store session data locally at the terminal. However, the amount of data exchanged in the session may be large (e.g., for audio clips), and the amount of memory at the terminal may be limited. In this case, it may not be possible to store an ongoing session in its entirety at the terminal. The automatic early saving at the network may then be used to overcome capacity limitations at the terminal.

In general, early automatic archival provides a backup mechanism that allows the user to later reclaim and archive data that was previously exchanged in the session. The user may decide whether or not to archive the session at any time during the session or even at the end of the session. If the user decides to archive the session, then the network performs the necessary administrative functions to inform the user and to appropriately identify the session data. If the user does not express an interest in archiving the session, then the network may purge the data, e.g., at the end of the session or some amount of time later.

In yet another embodiment, the user may initially store session data at the terminal. The user or the terminal may thereafter request archival at the network, e.g., if the storage limit of the terminal has been reached.

The archival of session data may also be initiated in other manners.

Authorization

A session may involve one or multiple users/parties/participants. Each user in the session may or may not desire data of that user to be archived, e.g., for privacy or other reasons. Authorization for archival may be requested from the users in order to provide privacy. If session data is to be archived at the network, then the network may request for authorization to archive in various manners.

In an embodiment, which is referred to as express authorization, the network queries each user engaged in a session for authorization to archive data exchanged during the session. A user may provide authorization when the user requests archival of the session. The user may also provide authorization at some other time. If authorization is received from all users in the session, then the network may archive all of the data exchanged among all of the users in the session. If authorization is received from only a subset of the users, then the network may archive the data of each user who provides authorization. The data of a user typically comprises data sent by that user but may include other data. If authorization is not received from any of the users in the session, then the network does not archive any of the data exchanged in the session. This embodiment may provide enhanced privacy since (1) users who provide authorization to the network can have the data that they sent during the session be archived and (2) users who do not provide authorization to the network will not have their data archived. The network may provide to each user a notice regarding the status of authorization provided by other users. Each user would then have knowledge of the data being archived.

In an embodiment, which is referred to as implicit authorization, authorization may be granted or denied by a user profile that may be maintained for a user at a terminal and/or the network. The user profile may contain (1) a field that indicates whether the user's data can be archived for use by the user, (2) a field that indicates whether the user's data can be archived for use by other users, and/or (3) other fields that may provide other types of authorization for archival. If authorization is granted by the user profile, then the network does not need to query the user for authorization but may provide a notice of the authorization granted by the user profile. This notice informs the user and allows the user to override the user profile, if desired. If authorization is not granted by the user profile, then the network may query the user for authorization. In this case, the user may, upon notification, authorize the network to archive data on a per-session basis.

For the embodiments described above, the network may provide notification of the on-going recording for the session. The parties in the session may then be informed of the recording.

For the early automatic archival described above, the users in a session may be notified that the session is being saved automatically. If any user in the session decides to archive the data (e.g., during the session or after the session has ended), then other users in the session may be notified and/or queried for authorization to archive. The network may then archive data of users who grant authorization and may purge data of users who do not grant authorization.

In an embodiment, authorization is granted or denied for all data exchanged in a session. In another embodiment, authorization may be granted for specific types of data such as, for example, voice, text, pictures, video, and so on. The network may indicate the different types of data that may be archived. A user may then authorize the network to archive any single type of data or any combination of data types. The network may then archive each data type that is authorized by the user. The network may provide to the user a notification of all data types being archived. This embodiment allows the user to selectively give authorization for each type of data and to be informed of each data type being archived.

Storage

Data exchanged during a session as well as other pertinent information may be archived for the session. The pertinent information may include synchronization information, identification information, user-supplied information, and so on. The synchronization information may be any information used to synchronize between different types of data being archived, e.g., voice and video. The identification information may convey parties in the session, the date and time of the session, and so on. The user-supplied information may include any information used to identify and manage session data, e.g., a title or nickname for the session.

In general, session data may be archived at a terminal and/or the network. In an embodiment, the data for a session may be stored at the terminal. At the end of the session or any time thereafter, the user may upload the data to the network for archival. Storage of session data at the terminal may provide certain advantages such as convenience. However, the memory at the terminal may be limited, which then limits the amount of session data that can be stored at the terminal. The user may initially store data at the terminal and may upload the data to the network for archival, e.g., if there is insufficient memory at the terminal, if the data is being shared with other users, and/or for other reasons.

In another embodiment, data for a session is archived at the network. The network may commence storage of data at the beginning of the session or at any time during the session, e.g., upon receiving a request to archive from the user. The network may store data in real-time during the session (e.g., line-by-line in the case of text) as data is being exchanged between users during the session.

Archival at the network may provide various advantages. First, the network typically has larger storage capacity, which allows for archival of more session data than capable by a typical terminal. Second, data may be conveniently archived during the session without utilizing additional air-link resources. Data is exchanged between the terminal and the network for communication with other users or other entities during the session. This data is conveniently available at the network for archival. Third, other features such as data sharing may be efficiently supported with archival at the network.

Management and Retrieval

Session data may be stored in various manners and in various formats at the network. In an embodiment, session data is stored as an Extensible Markup Language (XML) document or a set of XML documents in a database. XML is widely used to store various types of data. XML Configuration Access Protocol (XCAP) may be used to reference the data that is archived using XML. HyperText Transfer Protocol (HTTP) may be used to store, retrieve, and manage the data stored in the database. XML, XCAP and HTTP are one example of formats and protocols that may be used to archive session data.

In an embodiment, a Uniform Resource Identifier (URI) is assigned to an archived session to facilitate access and management of the session data. The network (e.g., the storage server) may automatically assign the URI to the session and may provide the URI to the user. The user may utilize this URI to manage (e.g., retrieve, edit, re-save, or share) the session data. The terminal may have a user interface (UI) that allows the user to define a human recognizable string for the URI provided by the network and to associate the user-defined string with the URI. The UI may also allow the user to associate various attributes such as name, date, participants, subject, and so on, with the URI. These user-defined attributes may be stored at the network as attributes of the document(s) archived for the session. The URI and associated attributes may also be stored at the terminal for easy retrieval by the user.

In general, session data may be archived using various formats and protocols and with various technologies and techniques. XML, XCAP, and HTTP are well-known protocols that are supported by many devices and may thus be conveniently used for archival purposes. Other standard protocols and/or proprietary protocols may also be used for query, retrieval, and storage of session data. URI is also widely used to identify documents. Other types of identifier may also be used to identify, classify, and manage session data.

A user may have any number of sessions archived at the network. The user may be able to manage (e.g., retrieve, modify, etc.) the archived session data from any device that is capable of receiving and rendering the session data. A list or directory of archived sessions may be provided to the user whenever requested. The list may be sorted by various attributes such as title, date, originator of the session, session type, size, and so on.

The user may manage the archived session data in various manners. The user may perform functions such as query, retrieve, add (save), delete, and so on. The user may select to retrieve session data in various manners. For example, the user may retrieve a specific session, a specific section of a session, a specific type of data stored for a session, specific contents that may be identified via a search, and so on. The user may retrieve an object such as a picture that is exchanged during a session or open an attachment sent during a session. The ability to selectively retrieve, manipulate, and store specific portions of a session may be advantageous, e.g., to reduce downloading or uploading of session data over the air between the network and the terminal.

Sharing

In general, the network entity or storage server used to archive session data may reside in any trusted network. For example, user 1 may be located in network A, user 2 may be located in network B, and networks A and B may both be trusted networks. In this case, the data for a session between users 1 and 2 may be archived in network A and/or network B. The session data may be archived in a single network (e.g., the network where the session is initiated) to reduce storage. The session data may also be archived in both networks to provide flexibility.

A single copy of session data may be archived and shared among multiple users even if these users have different access privileges. For a session between multiple users, a single copy of the session data may be archived in a designated network while the session is alive. After termination of the session, this single copy may be made accessible to all users who request to archive the session. The archival of a single copy may be accomplished even if (1) authorization is received from only some of the users in the session or (2) a given user grants different permissions to different users in the session. The network may determine the access privilege for each user in the session based on the authorizations received from all users in the session. As an example, a session may have three users—users 1, 2 and 3. User 1 may be granted access privilege to (1) only data of user 1 if users 2 and 3 do not give authorization for user 1, (2) data of users 1 and 2 if user 2 gives authorization but user 3 does not give authorization, or (3) data of all three users 1, 2 and 3 if both users 2 and 3 give authorization. The designated network may store different access privileges for different users along with the session data. Thereafter, the network may authenticate each attempt to access/manage the session data by each user and may grant access to only the data authorized for that user. The sharing of archived session data may greatly reduce storage requirements.

Security

The session data may be archived in a secured manner to ensure privacy and to protect sensitive data. Security may be implemented at one or more layers such as an application layer and/or lower layers. For example, security may entail a user-defined password that may be provided at the time of storage, by the user profile, and/or via some other means. Security may be invoked each time the archived data is accessed, and the user may be authenticated before data is released. Security may also be achieved via encryption and/or other means that are commonly used to send secure data.

System

Figure 3:
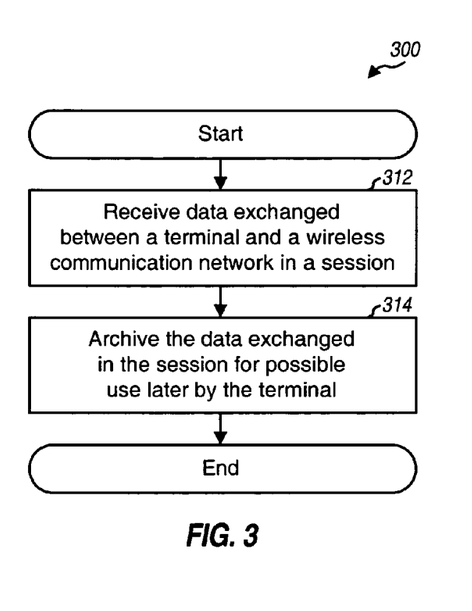
FIGS. 3 and 4 show processes performed by a network entity for archiving session data.

FIG. 3 shows an embodiment of a process 300 for archiving session data. Process 300 may be performed by a network entity, e.g., a storage server, an application server, or some other network entity. The network entity receives data exchanged between a terminal and a wireless communication network in a session (block 312). The network entity archives the data exchanged in the session for possible use later by the terminal (block 314).

Figure 4:
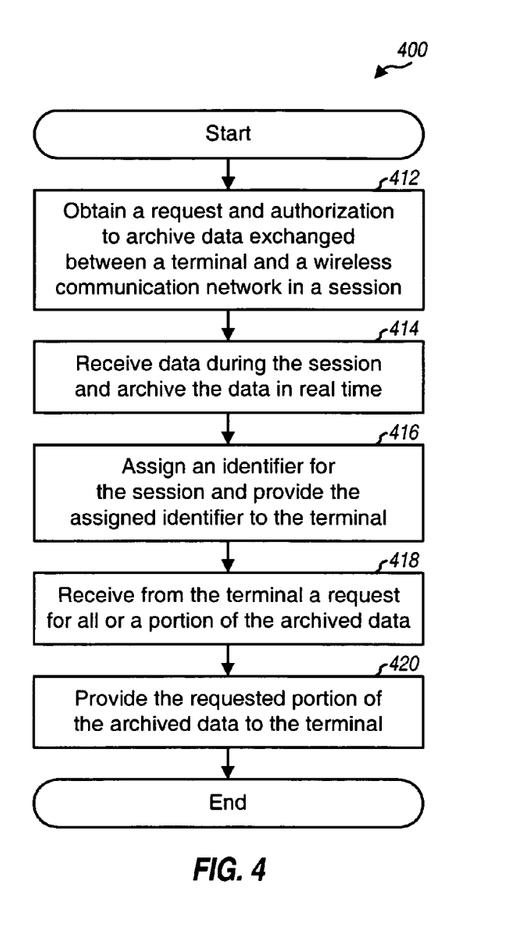

FIG. 4 shows an embodiment of a process 400 for archiving session data. Process 400 may also be performed by a network entity. The network entity may obtain a request and authorization to archive data exchanged between a terminal and a wireless communication network in a session (block 412). The network entity may also automatically save session data beginning at the start of the session for possible archival later. In any case, the request and authorization may be explicitly sent by the terminal to the network entity or may be implicitly obtained from a user profile for the terminal. The terminal may communicate with other terminals in the session. If archival is requested by any terminal in the session, then the network entity may query each terminal in the session for authorization and/or may obtain authorization from a user profile for that terminal. The network entity may archive only data of each terminal that provides authorization. The network entity may provide notification of data being stored.

The network entity may receive data during the session and may archive the data in real time (block 414). Alternatively, the terminal may upload data via the wireless network after the session has terminated, and the network entity may then archive the uploaded data. The network entity may archive the session data as one or more XML documents or in some other format. The network entity may assign an identifier for the session and provide the assigned identifier to the terminal (block 416). The identifier may be a URI or some other type of identifier. The network entity may receive from the terminal user-defined attributes descriptive of the session and may then store the user-defined attributes with the archived data.

The network entity may receive from the terminal a request for all or a portion of the archived data (block 418). The request may come during the session or after termination of the session. The requested portion may be for a specific type of data (e.g., voice) among different types of data archived for the session. The requested portion may also be for a specific object or element, e.g., a picture or an attachment. In any case, the network entity provides the requested portion of the archived data to the terminal (block 420). The network entity may implement (or interact with) a search engine that supports searching of data archived for the session, as requested by the terminal. The search engine may operate based on various attributes such as name, type, size, parties, date, and so on.

The terminal may communicate with other terminals in the session. The network entity may store a single copy of the session data for archival for all terminals in the session. The network entity may receive authorizations for archival from all or some of the terminals in the session. The network entity may then store separate access privileges for the terminals based on the received authorizations.

Figure 5:
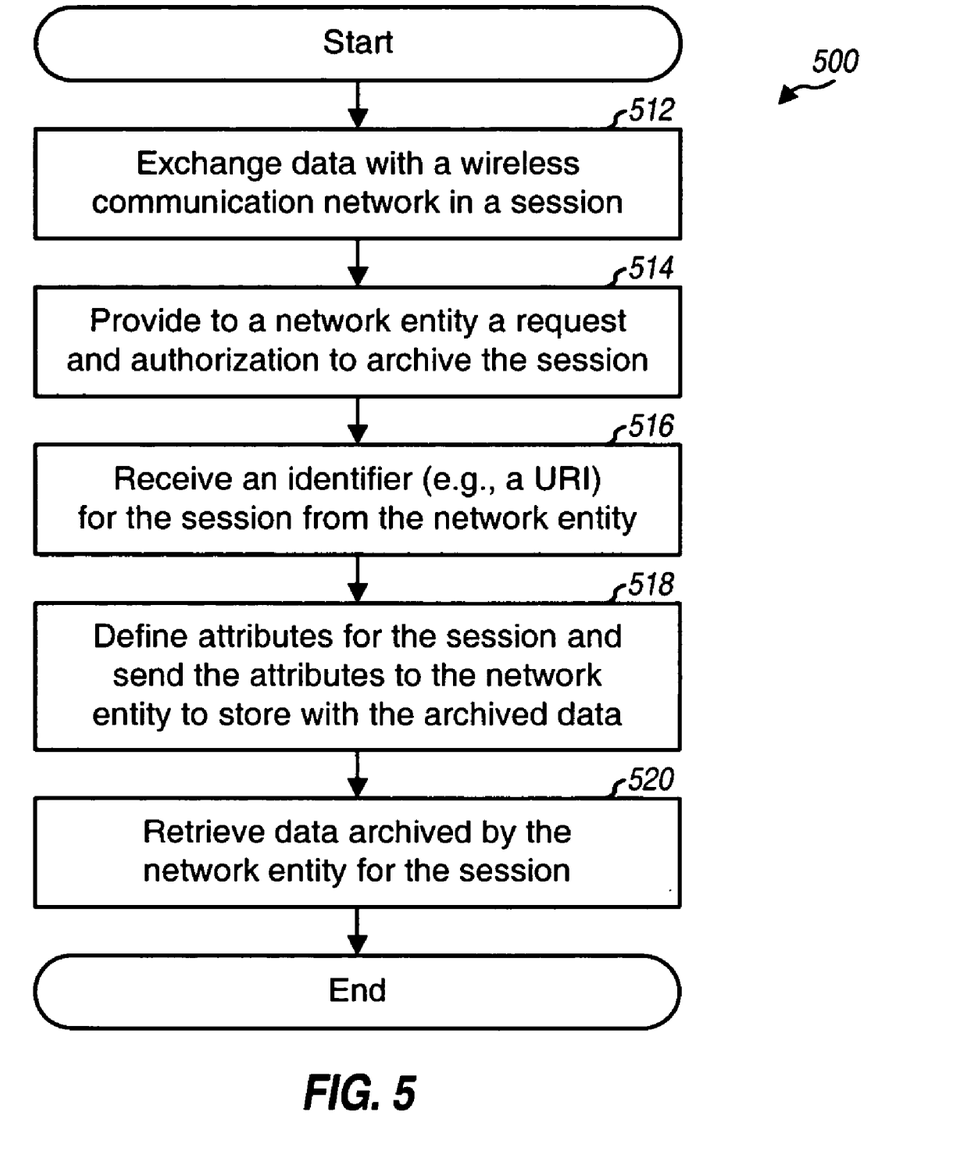
FIG. 5 shows a process performed by a terminal for archiving session data.

FIG. 5 shows an embodiment of a process 500 for archiving a session. Process 500 may be performed by a terminal. The terminal exchanges data with a wireless communication network in a session (block 512). The terminal may provide to a network entity (e.g., a storage server) a request and authorization to archive the session (block 514). The network entity may also obtain this request and authorization from a user profile for the terminal. The network entity may also automatically save session data, e.g., beginning at the start of the session. In this case, the terminal may send a request to archive the session after the network entity has commenced saving the session data, e.g., at the middle or the end of the session. The network entity may store the session data in real time during the session. The terminal may also store the data initially and may thereafter upload the data to the network entity for archival. The network entity may archive all of the session data or only data of the terminal, depending on whether authorization is received from other terminals in the session. The archived data for the session may thus be all or a portion of the data that is exchanged between the terminal and the wireless network for the session.

The terminal may receive an identifier (e.g., a URI) for the session from the network entity (block 516). The terminal may define attributes of the session and may send these attributes to the network entity for storage and association with the archived data (block 518). During or after the session, the terminal may retrieve data archived by the network entity for the session (block 520). For example, the terminal may send a request for all or a portion of the archived data, and the network entity may then return the requested portion of the archived data.

Figure 6:
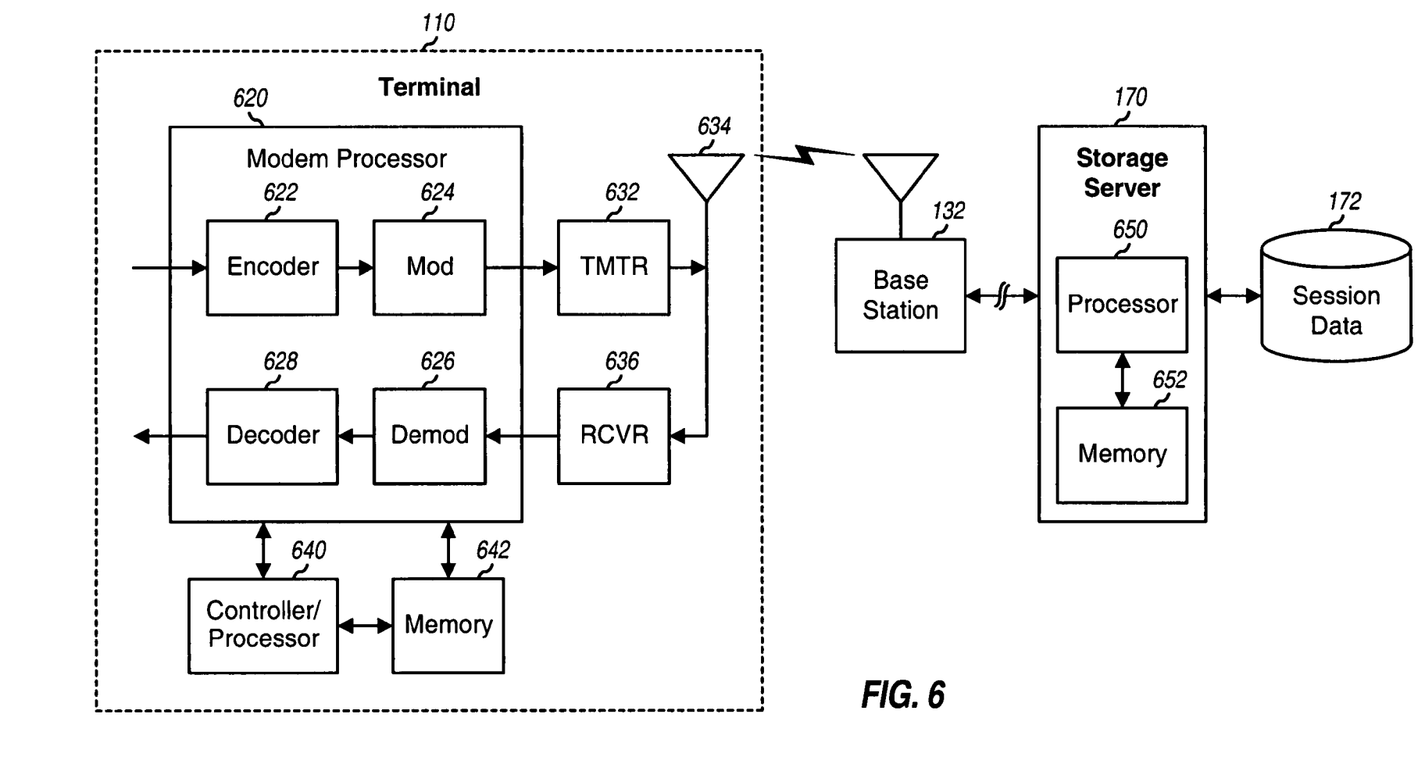
FIG. 6 shows a block diagram of a terminal and a storage server capable of archiving session data.

FIG. 6 shows a block diagram of an embodiment of a terminal 110 and storage server 170. Terminal 110 includes a wireless modem for communication with a wireless network. On the transmit path, data and signaling to be sent by terminal 110 are processed (e.g., formatted, encoded, and interleaved) by an encoder 622 and further processed (e.g., modulated, channelized, and scrambled) by a modulator (Mod) 624 to generate output chips. A transmitter (TMTR) 632 then conditions (e.g., converts to analog, filters, amplifies, and frequency upconverts) the output chips and generates a reverse link signal, which is transmitted via an antenna 634. On the receive path, forward link signals transmitted by base stations in the wireless network are received by antenna 634. A receiver (RCVR) 636 conditions (e.g., filters, amplifies, frequency downconverts, and digitizes) the received signal from antenna 634 and provides samples. A demodulator (Demod) 626 processes (e.g., descrambles, channelizes, and demodulates) the samples and provides symbol estimates. A decoder 628 further processes (e.g., deinterleaves and decodes) the symbol estimates and provides decoded data. Encoder 622, modulator 624, demodulator 626, and decoder 628 may be implemented by a modem processor 620. These units perform processing in accordance with the radio technology (e.g., W-CDMA, cdma2000 or GSM) used by the wireless network.

Controller/processor 640 directs the operation of various units at terminal 110. Controller/processor 640 may implement process 500 shown in FIG. 5 and/or other processes for archival of session data for terminal 110. A memory 642 stores program codes and data for terminal 110.

Storage server 170 includes a processor 650 that performs various functions to support archival of session data and a memory 652 that stores program codes and data for storage server 170. Processor 650 may also direct storage, retrieval, and modification of data in storage unit 172. Processor 650 may be a single processor or a collection of processors. Storage server 170 may implement process 300 in FIG. 3, process 400 in FIG. 4, and/or other processes to support archival of data for terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a processor for receiving data exchanged between a terminal and a wireless communication network in a session, the received data including more than one of a plurality of data types; and
a storage unit coupled to the processor and for selectively archiving the data exchanged in the session based on an associated data type of the received data,
wherein the processor receives from the terminal a request for a portion of the data archived for the session, the requested data corresponding to less than all of the archived data for the session, and wherein the storage unit provides the requested portion of the archived data,
wherein the processor receives the request to archive a specific type of data among multiple types of data exchanged in the session, and wherein the storage unit archives the specific type of data for the session,
wherein the terminal communicates with at least one other terminal in the session,
wherein the processor receives authorization for archival from the terminal but not from the at least one other terminal, and
wherein the storage unit archives data of the terminal for the session and not data of the at least one other terminal.

2. The apparatus of claim 1, wherein the processor receives from the terminal a request to archive the session and initiates archival of the data for the session in response to the request.

3. The apparatus of claim 1, wherein the processor initiates archival of the data for the session based on a user profile for the terminal.

4. The apparatus of claim 1, wherein the processor automatically saves the data for the session beginning at the start of the session and archives the data upon receiving a request for archival from the terminal.

5. The apparatus of claim 1, wherein the processor queries the terminal for authorization to archive the data for the session.

6. The apparatus of claim 1, wherein the processor obtains authorization to archive the data for the session from a user profile.

7. The apparatus of claim 1, wherein the processor provides to the terminal a notification of data being stored.

8. The apparatus of claim 1, wherein the processor receives the data in real time during the session, and wherein the storage unit archives the data in real time.

9. The apparatus of claim 1, wherein the terminal uploads the data via the wireless communication network after the session has terminated, and wherein the storage unit archives the uploaded data.

10. The apparatus of claim 1, wherein the processor formats the data for the session as one or more Extensible Markup Language (XML) documents.

11. The apparatus of claim 1, wherein the processor assigns a Uniform Resource Identifier (URI) for the session and provides the URI to the terminal.

12. The apparatus of claim 1, wherein the processor receives from the terminal at least one user-defined attribute descriptive of the session, and wherein the storage unit stores the at least one user-defined attribute for the session.

13. The apparatus of claim 1, wherein the storage unit archives the data for the session based on type, size, or other attributes of the session.

14. The apparatus of claim 1, wherein the requested portion is for a specific type of data among multiple types of data archived for the session.

15. The apparatus of claim 1, wherein the requested portion is for a specific element among the data archived for the session.

16. The apparatus of claim 1, wherein the processor receives a search request from the terminal and searches the data archived by the storage unit based on the search request.

17. The apparatus of claim 1, wherein the terminal communicates with at least one other terminal in the session, and wherein the storage unit archives a single copy of the data exchanged in the session for all terminals in the session.

18. The apparatus of claim 17, wherein the processor receives authorizations for archival from one or more of the terminals in the session and determines access privilege to the archived data for each terminal in the session based on the received authorizations, and wherein the storage unit stores separate access privileges for the terminals.

19. A method comprising:
- receiving data exchanged between a terminal and a wireless communication network in a session, the received data including more than one of a plurality of data types;
- selectively archiving the data exchanged in the session for possible use later by the terminal based on an associated data type of the received data;
- receiving, from the terminal, a request for a portion of the data archived for the session, the requested data corresponding to less than all of the archived data for the session,
- wherein the request is to archive a specific type of data among multiple types of data exchanged in the session; and
- providing the requested portion and the specific data type of the archived data,
- wherein the archiving the data exchanged in the session comprises archiving data of the terminal and not data of other terminals in the session if authorization for archival is not received from the other terminals.

20. The method of claim 19, further comprising:
- receiving from the terminal a request to archive the session; and
- initiating archival of the data for the session in response to the request.

21. An apparatus comprising:
- means for receiving data exchanged between a terminal and a wireless communication network in a session, the received data including more than one of a plurality of data types;
- means for selectively archiving the data exchanged in the session for possible use later by the terminal based on an associated data type of the received data;
- means for receiving, from the terminal, a request for a portion of the data archived for the session, the requested data corresponding to less than all of the archived data for the session,
- wherein the request is to archive a specific type of data among multiple types of data exchanged in the session; and
- means for providing the requested portion and the specific data type of the archived data, wherein the terminal communicates with at least one other terminal in the session, and
- wherein authorization is received for archival from the terminal but not from the at least one other terminal, and
- wherein the means for selectively archiving archives data of the terminal for the session and not data of the at least one other terminal.

22. The apparatus of claim 21, further comprising:
- means for receiving from the terminal a request to archive the session; and
- means for initiating archival of the data for the session in response to the request.

23. The apparatus of claim 21, wherein the means for archiving the data exchanged in the session comprises means for archiving only data of the terminal and not data of other terminals in the session if authorization for archival is not received from the other terminals.

24. An apparatus comprising:
- a processor for exchanging data with a wireless communication network in a session and for retrieving data archived by a network entity for the session, the exchanged data including more than one of a plurality of data types; and
- a memory coupled to the processor and for selectively storing the data retrieved from the network entity based on an associated data type of the exchanged data,
- wherein the processor sends a request to the network entity for a portion of the data archived for the session, the requested data corresponding to less than all of the archived data for the session,
- wherein the request is to archive a specific type of data among multiple types of data exchanged in the session,
- wherein the apparatus corresponds to a terminal in communication with at least one other terminal in the session, and
- wherein the terminal authorizes archival for the session and the at least one other terminal does not authorize archival for the session, and
- wherein the memory stores data of the terminal for the session and not data of the at least one other terminal.

25. The apparatus of claim 24, wherein the processor sends to the network entity a request to archive the session.

26. The apparatus of claim 24, wherein the network entity automatically saves the data exchanged with the wireless communication network, and wherein the processor sends to the network entity a request to archive the session after the network entity has commenced saving the exchanged data.

27. The apparatus of claim 24, wherein the processor provides to the network entity authorization to archive the data exchanged with the wireless communication network.

28. The apparatus of claim 24, wherein the processor uploads the data exchanged with the wireless communication network for archival by the network entity.

29. The apparatus of claim 24, wherein the processor receives the requested data from the network entity.

30. A method of operating a terminal, comprising:
- exchanging data with a wireless communication network in a session, the exchanged data including more than one of a plurality of data types;
- providing to a network entity a request to selectively archive the data exchanged in the session based on an associated data type of the exchanged data; and
- retrieving data archived by the network entity for the session by sending a request to the network entity for a portion of the data archived for the session, the requested data corresponding to less than all of the archived data for the session,
- wherein the request is to archive a specific type of data among multiple types of data exchanged in the session,
- wherein the terminal is in communication with at least one other terminal in the session, and
- wherein the terminal authorizes archival for the session and the at least one other terminal does not authorize archival for the session, and
- wherein the network entity archives data of the terminal for the session and not data of the at least one other terminal.

31. The method of claim 30, wherein the providing to the network entity the request to archive comprises sending to the network entity the request to archive the session after the network entity has automatically commenced saving the data exchanged with the wireless communication network.

32. The method of claim 30, wherein the retrieving the data archived by the network entity for the session comprises receiving the requested data from the network entity.

33. An apparatus comprising:
- means for exchanging data with a wireless communication network in a session, the exchanged data including more than one of a plurality of data types;

means for providing to a network entity a request to selectively archive the data exchanged in the session based on an associated data type of the exchanged data; and means for retrieving data archived by the network entity for the session by sending a request to the network entity for a portion of the data archived for the session, the requested data corresponding to less than all of the archived data for the session, wherein the request is to archive a specific type of data among multiple types of data exchanged in the session, wherein the apparatus corresponds to a terminal in communication with at least one other terminal in the session, and wherein the terminal authorizes archival for the session and the at least one other terminal does not authorize archival for the session, and wherein the network entity archives data of the terminal for the session and not data of the at least one other terminal.

34. The apparatus of claim 33, wherein the means for providing to the network entity the request to archive comprises means for sending to the network entity the request to archive the session after the network entity has automatically commenced saving the data exchanged with the wireless communication network.

35. The apparatus of claim 33, wherein the means for retrieving the data archived by the network entity for the session comprises means for receiving the requested data from the network entity.

36. A non-transitory computer-readable medium having a computer program, which when executed by at least one processor, operates to execute instructions in a processor in an apparatus, the computer program comprising:

program code to receive data exchanged between a wireless communications terminal and a wireless communication network in a session, the received data including more than one of a plurality of data types;

program code to selectively archive the data exchanged in the session for possible use later by the terminal based on an associated data type of the received data;

receiving, from the terminal, a request for a portion of the data archived for the session, the requested data corresponding to less than all of the archived data for the session, wherein the request is to archive a specific type of data among multiple types of data exchanged in the session; and providing the requested portion and the specific data type of the archived data, wherein the program code to selectively archive archives data of the terminal and not data of other terminals in the session if authorization for archival is not received from the other terminals.

37. A non-transitory computer-readable medium having a computer program, which when executed by at least one processor, operates to execute instructions in a processor in an apparatus, the computer program comprising:

program code to exchange data with a wireless communication network in a session, the exchanged data including more than one of a plurality of data types;

program code to provide to a network entity a request to selectively archive the data exchanged in the session based on an associated data type of the exchanged data; and program code to retrieve data archived by the network entity for the session by sending a request to the network entity for a portion of the data archived for the session, the requested data corresponding to less than all of the archived data for the session, wherein the request is to archive a specific type of data among multiple types of data exchanged in the session, wherein the apparatus corresponds to a terminal in communication with at least one other terminal in the session, and wherein the terminal authorizes archival for the session and the at least one other terminal does not authorize archival for the session, and wherein the network entity archives data of the terminal for the session and not data of the at least one other terminal.

38. The method of claim 19, wherein the plurality of data types include two or more of voice, video, text, pictures, graphics and electronic messages.

39. The method of claim 19, wherein the selective archiving of the exchanged data is performed such that a first set of data types among the exchanged data in the session are archived, and a second set of data types among the exchanged data in the session are not archived.

40. The method of claim 19, wherein the session corresponds to a real-time two-way communication session between the terminal and at least one other terminal whereby, during the real-time two-way communication session, data is transferred from the terminal to the at least one other terminal and also from the at least one other terminal to the terminal.

41. The method of claim 40, wherein the selectively archived data is exchanged between the terminal and the at least one other terminal during the real-time two-way communication session, and wherein the received request from the terminal for the portion of the archived data is received after termination of the real-time two-way communication session.

42. The method of claim 19, wherein the selectively archived data includes data from different of the plurality of data types, wherein the request from the terminal specifically identifies less than all of the data types archived by the selectively archiving step for the session, and wherein the requested portion of the archived data is the archived data for the session that is of the specifically identified data type.

* * * * *